United States Patent

Szuba et al.

[11] Patent Number: 6,135,680
[45] Date of Patent: Oct. 24, 2000

[54] BORING TOOL WITH STAGGERED ROTARY CUTTING INSERTS

[75] Inventors: Philip S. Szuba, Clinton Township; Peter M. Beecherl, Shelby Township; Gregory Jon Kinsler, Utica, all of Mich.

[73] Assignee: Unova IP Corp., Woodland Hills, Calif.

[21] Appl. No.: 09/256,539

[22] Filed: Feb. 24, 1999

[51] Int. Cl.[7] .............................. B23B 27/12; B23B 27/16
[52] U.S. Cl. .............................. 408/224; 407/7; 408/713; 408/227
[58] Field of Search .................................... 408/223, 224, 408/233, 713, 227; 407/7, 64, 65

[56] References Cited

U.S. PATENT DOCUMENTS

| | | | |
|---|---|---|---|
| 2,180,823 | 11/1939 | Harrison | 407/7 |
| 3,213,716 | 10/1965 | Getts | 408/713 |
| 4,477,211 | 10/1984 | Briese | 407/7 |
| 4,975,002 | 12/1990 | Kress et al. | 408/224 |
| 6,073,524 | 6/2000 | Weiss et al. | 82/1.11 |

*Primary Examiner*—Steven C. Bishop
*Attorney, Agent, or Firm*—Brian L. Ribando

[57] ABSTRACT

A boring tool is provided with rotary cutting inserts which rotate as a result of the forces which act on the inserts as the tool bores a workpiece. The inserts are positioned on the tool so that the cutting point of each insert is located in a different radial plane along the axis of the tool. The inserts are also positioned on the tool so that the radial distance of the cutting point of each insert from the axis of the tool is different. The non-symmetrical positioning of the inserts on the boring tool provides improved performance of the tool over a tool in which the inserts are symmetrically positioned.

12 Claims, 2 Drawing Sheets

BORING TOOL WITH STAGGERED ROTARY CUTTING INSERTS

FIELD OF THE INVENTION

The invention relates to a boring tool with multiple cutting inserts which are mounted for rotation with respect to the tool in which the positioning of the cutting inserts is non-symmetrical with respect to the axis of the tool.

BACKGROUND OF THE INVENTION

Cutting tools having rotating cutting inserts are known in the art. U.S. Pat. Nos. 4,621,955 and 4,477,211, both issued to Leonard A. Briese, show cutting tools having rotating cutting inserts. The inserts in each of the Briese patents are generally cylindrical and are mounted for rotation about a central axis. In use, the forces acting on the insert as the insert cuts through a workpiece cause the insert to rotate about its central axis. The rotation of the insert continually changes the cutting edge of the insert which is in contact with the workpiece resulting in longer insert life and lower cutting forces.

A U.S. Patent Application entitled Metal Boring With Self-Propelled Rotary Inserts was filed in the U.S. Patent Office on Mar. 4, 1998, and was assigned to Rotary Technologies Corporation. That application describes a boring tool with rotary cutting inserts in which the inserts are symmetrically mounted in the tool with respect to the boring tool axis. It has been determined that improved results can be obtained by mounting the rotary cutting inserts in a boring tool so that the inserts are non-symmetrically mounted and staggered with respect to the axis of the tool.

SUMMARY AND OBJECTS OF THE INVENTION

According to the invention, a boring tool is provided with rotary cutting inserts which are mounted non-symmetrically with respect to the axis of the tool so that their points of contact with the wall of a bore in a workpiece are located at different radial distances from the axis of rotation of the tool. The inserts are also staggered axially so that they lie in different planes along the axis of the tool. A boring tool constructed according to the instant invention exhibits less chatter during a boring operation than a boring tool having symmetrically mounted rotary cutting inserts.

It is accordingly an object of the invention to provide a boring tool with rotary cutting inserts in which the inserts are staggered along the axis of the tool.

It is another object of the invention to provide a boring tool with rotary cutting inserts in which the inserts are located at different distances along radial lines extending outward from the axis of the tool.

It is still another object of the invention to provide a boring tool with non-symmetrically mounted rotary cutting inserts in the tool.

These and other objects of the invention will be apparent to those skilled in the art from the following detailed description taken in conjunction with the accompanying drawing figures.

DETAILED DESCRIPTION OF THE INVENTION

Figure 1:
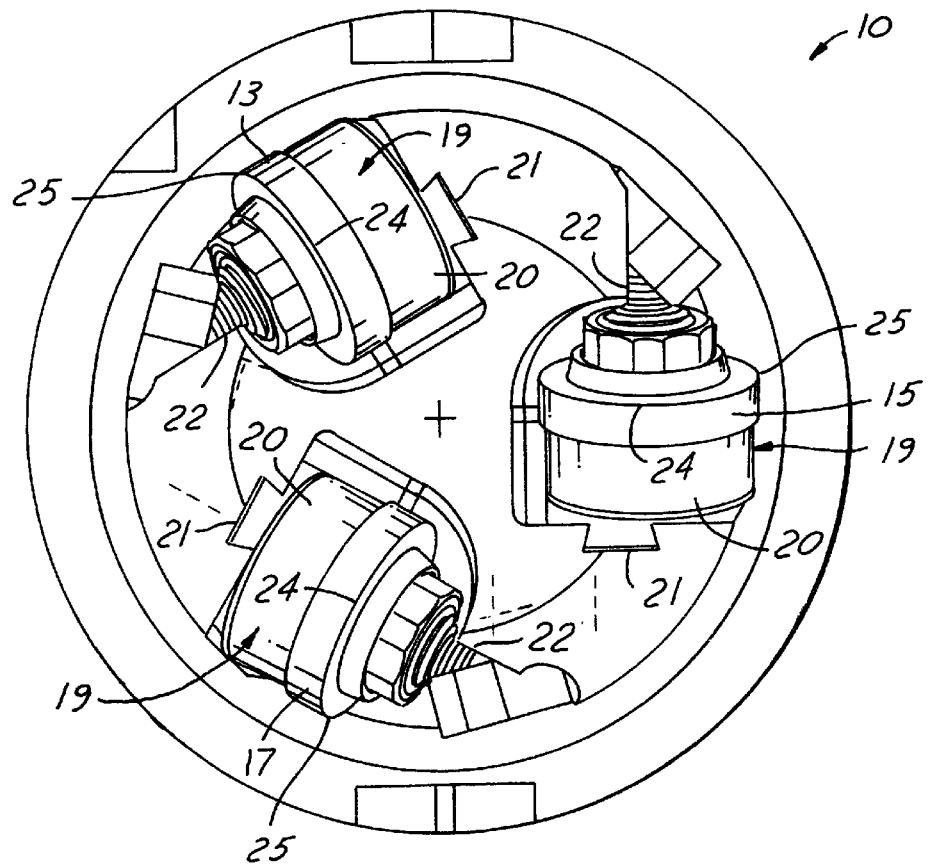
FIG. 1 shows an end view of a boring tool having multiple cutting inserts.

Turning now to the drawing figures, FIG. 1 shows an end view of boring tool 10 with an axis of rotation 12. Three cutting inserts 13, 15, and 17 are mounted in the end of the tool 10. Each insert is mounted on a holder 19 which includes a bearing 20, a dovetail coupling 21, and a threaded fastener 22. The holder 19 is more fully described in the above mentioned patent application filed on Mar. 4, 1998, and forms no part of the present invention. The center of rotation of the leading insert 13 has radial spacing $R_1$ measured from the axis of rotation 12. The center of rotation of the intermediate insert 15 has a radial spacing $R_2$ measured from the axis of rotation 12. The center of rotation of the trailing insert 17 has a radial spacing $R_3$ measured from the axis of rotation 12. Each insert cuts with a forward edge 24 and has a cutting point 25 defined as that point on the forward edge 24 which is farthest from the axis of rotation 12.

Figure 2:
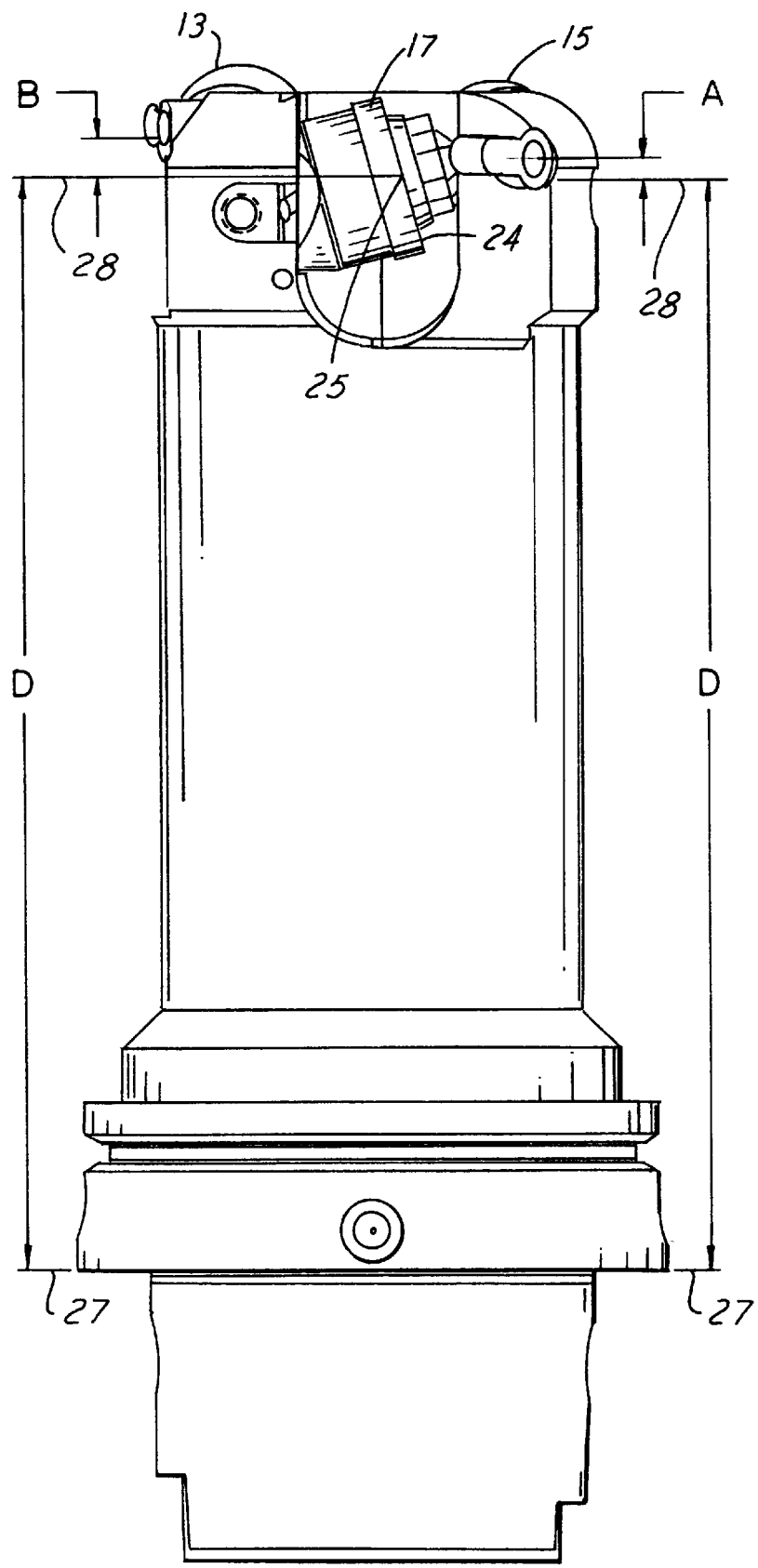
FIG. 2 shows a side view of a boring tool with multiple cutting inserts.

FIG. 2 shows a side view of boring tool. The trailing insert 17 is defined as the insert which is closest to the gage line 27 of the boring tool. The cutting point 25 of the trailing insert 17 is axially spaced a distance D from the gage line 27 of the tool 10 to allow the tool to bore to a desired depth in a workpiece. A plane 28 can be defined which contains the cutting point 25 and is orthogonal to the axis of rotation 12. The additional axial offsets of the leading and intermediate cutting inserts 13 and 15, respectively, are measured from the plane 28. The cutting point 25 of the intermediate cutting insert 15 is axially spaced a distance A from the plane 28, and the cutting point 25 of the leading cutting insert 13 is axially spaced a distance B from the plane 28. The axial position of the inserts 13, 15, and 17 on the boring tool creates an axially staggered insert array.

Figure 3:
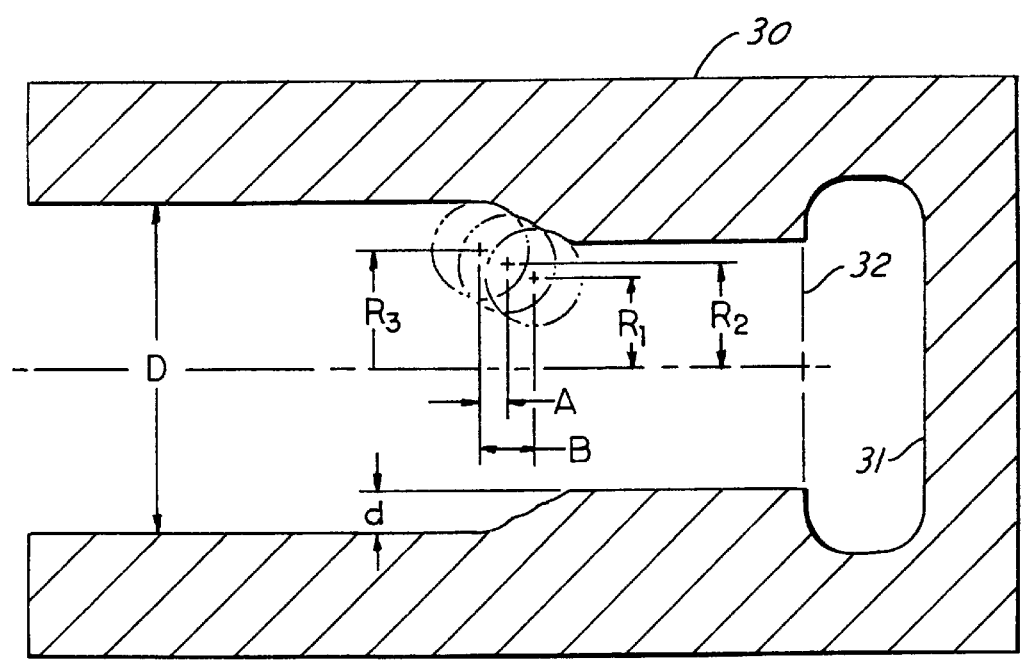
FIG. 3 is a graphical representation of the cutting paths created using multiple cutting inserts in a boring tool.

FIG. 3 shows the relationship between the radial spacings $R_1$, $R_2$, and $R_3$ of the inserts 13, 15, and 17, as well as the axial staggers A and B. When the depth of cut d is desired to be machined into a workpiece 30, and a final bore diameter D is desired, axial staggers A and B are chosen to be greater than zero but not so great to cause the insert 13 to come into contact with the workpiece end surface 31 before the insert 17 has cut past the plane 32 which defines the end of the bore.

In order to determine the radial spacings $R_3$, $R_2$, and $R_1$, Equation I must be solved first to determine the spacing $R_3$. After a value for $R_3$ has been found, Equation II is solved to determine the spacing $R_2$. After a value for $R_2$ has been found, Equation III is solved to determine the spacing $R_1$.

$$R_3 = \frac{D}{2} - r \qquad \text{Equation I}$$

$$R_2 = R_3 + \left[\left(r - \frac{d}{3}\right) - \sqrt{r^2 - \left[\sqrt{r^2 - \left(r - \frac{d}{3}\right)^2} - A\right]^2}\right] \qquad \text{Equation II}$$

$$R_1 = R_2 + \left(r - \frac{2d}{3}\right) + (R_3 - R_2) -$$

$$\sqrt{r^2 - \left[A + \sqrt{\left[r^2 - \left\{\left(r - \frac{2d}{3}\right) + (R_3 - R_2)\right\}^2\right]} - B\right]^2} \qquad \text{Equation III}$$

In the following example, the finish bore diameter D is equal to 3.0", the depth of cut d is equal to 0.1", the diameter r of the inserts is equal to 0.5", the stagger A is equal to 0.1", and the stagger B is equal to 0.2". By solving Equations I, II, and III, it will be determined that $R_3$ equals 1.0", $R_2$ equals 0.973", and $R_1$ equals 0.9425". According to the invention, the staggers A and B can also be selected so that the stagger B is more than twice A, or less than twice A.

Equations I–III can be used to calculate the radial spacing of the cutting inserts that will yield equal cutting depths for each of the cutting inserts. It is within the scope of this invention to include unequal radial spacing between cutting inserts to produce boring tool configurations which can be used to produce improved surface finish, part quality and tool life. This is accomplished by adjusting the position of the inserts so that R3 minus R2 is less than R2 minus R1. It is also within the scope of this invention to use the teachings herein for boring tools which have only two, or more than three, rotating cutting inserts.

Having thus described the invention, various modifications and alterations will occur to those skilled in the art, which modifications and alterations are intended to be within the scope of the invention as described by the appended claims.

We claim:

1. A rotary boring tool comprising:
   an elongated boring tool body and a cutting tool end, the elongated boring tool body having a central axis which is coincident with the axis of rotation of the boring tool;
   a plurality of rotary cutting tool inserts mounted on the cutting tool end of the elongated body, each rotary cutting tool insert rotating about its own axis during cutting and having a cutting tool point which contacts the bore of a workpiece,
   each cutting tool point lying in a plane which is orthogonal to the central axis of the boring tool body, wherein at least one of the planes which contains one of the cutting tool points is spaced from the planes which contain the other cutting tool points.

2. The rotary boring tool of claim 1 further comprising:
   at least three inserts comprising the cutting tool inserts, wherein each insert has a cutting tool point which lies in a plane which is orthogonal to the cutting tool axis, and wherein all of the planes are spaced from the other planes which contain the other cutting tool points.

3. The rotary boring tool of claim 2 further comprising:
   three cutting tool inserts and three planes, wherein the spacing between one of the end planes and the middle plane is different than the spacing between the other end plane and the middle plane.

4. A rotary boring tool comprising:
   an elongated boring tool body and a cutting tool end, the elongated boring tool body having a central axis which is coincident with the axis of rotation of the boring tool;
   a plurality of rotary cutting inserts mounted on the cutting tool end of the elongated body, each rotary cutting insert rotating about its own axis during cutting and having a cutting tool point which contacts the bore of a workpiece;
   each cutting tool point lying along a radial line which extends from the central axis, wherein the distance measured from the central axis to the cutting tool point for one of the rotary cutting inserts is greater than the distance measured from the central axis to the cutting tool point for one of the other rotary cutting inserts.

5. The rotary boring tool of claim 4 further comprising:
   at least three inserts comprising the rotary cutting inserts, wherein each insert has a cutting tool point which lies along a line extending from the central axis, and wherein each of the lines extending from the central axis to the cutting tool points of the three rotary inserts are different in length from the other lines.

6. A rotary boring tool comprising:
   an elongated boring tool body and a cutting tool end, the elongated boring tool body having a central axis which is coincident with the axis of rotation of the boring tool;
   a plurality of rotary cutting tool inserts mounted on the cutting tool end of the elongated body, each rotary cutting tool insert rotating about its own axis during cutting and having a cutting tool point which contacts the bore of a workpiece;
   each cutting tool point lying in a plane which is orthogonal to the central axis of the boring tool body, wherein at least one of the planes which contains one of the cutting tool points is spaced from the planes which contain the other cutting tool points; and
   each cutting tool point lying along a radial line which extends from the central axis, wherein the distance measured from the central axis to the cutting tool point for one of the rotary cutting inserts is greater than the distance measured from the central axis to the cutting tool point for one of the other rotary cutting inserts.

7. The rotary boring tool of claim 6 further comprising:
   at least three inserts comprising the cutting tool inserts, wherein each insert has a cutting tool point which lies in a plane which is orthogonal to the cutting tool axis, and wherein all of the planes are spaced from the other planes which contain the other cutting tool points.

8. The rotary boring tool of claim 7 wherein each insert has a cutting tool point which lies along a line extending from the central axis, and wherein each of the lines extending from the central axis to the cutting tool points of the three rotary cutting tool inserts are different in length from the other lines.

9. The rotary boring tool of claim 8 further comprising:
   three cutting tool inserts and three planes, wherein the spacing between one of the end planes and the middle plane is different than the spacing between the other end plane and the middle plane.

10. A rotary boring tool comprising:
    an elongated boring tool body and a cutting tool end, the elongated boring tool body having a central axis which is coincident with the axis of rotation of the boring tool;
    a plurality of rotary cutting tool inserts mounted on the cutting tool end of the elongated body, each rotary cutting tool insert rotating about its own axis during cutting and having a cutting tool point which contacts the bore of a workpiece;
    each cutting tool point lying in a plane which is orthogonal to the central axis of the boring tool body, wherein at least one of the planes which contains one of the cutting tool points is spaced from the planes which contain the other cutting tool points; and
    each cutting tool point lying along a radial line which extends from the central axis, wherein the distances $R_1$, $R_2$ and $R_3$ measured from the central axis to the cutting tool point for each of the rotary cutting inserts are different from one another,
    wherein $R_3$ is greater than $R_2$ and $R_2$ is greater than $R_1$, and wherein the values for $R_1$, $R_2$ and $R_3$ are determined by using a first equation to determine $R_3$, then using $R_3$ in a second equation to determine $R_2$, then using $R_3$ and $R_2$ in a third equation to determine $R_1$.

11. The rotary boring tool of claim 10 wherein the first equation is $R_3 = D/2 - r$ where D is the finish bore diameter and r is the diameter of the rotary cutting tool insert.

12. The rotary boring tool of claim 11 wherein the second equation is $$R_2 = R_3 + \left[\left(r - \frac{d}{3}\right) - \sqrt{r^2 - \left[\sqrt{r^2 - \left(r - \frac{d}{3}\right)^2} - A\right]^2}\right]$$

where d is the depth of cut and A is the axial stagger between the inserts located at the distances $R_3$ and $R_2$ from the central axis of the rotary boring tool.

* * * * *